(12) United States Patent  
Eispert et al.

(10) Patent No.: US 8,153,230 B2  
(45) Date of Patent: Apr. 10, 2012

(54) MULTILAYER PAPER TAPE

(75) Inventors: Karl-Heinz Eispert, Kaiserslautern (DE); Thomas Schönung, Freimersheim (DE)

(73) Assignee: GarnTec GmbH, Neidenfels (DE)

( * ) Notice: Subject to any disclaimer, the term of this patent is extended or adjusted under 35 U.S.C. 154(b) by 380 days.

(21) Appl. No.: 12/385,275

(22) Filed: Apr. 3, 2009

(65) Prior Publication Data

US 2009/0258181 A1    Oct. 15, 2009

(30) Foreign Application Priority Data

Apr. 9, 2008   (DE) .......................... 10 2008 018 031

(51) Int. Cl.  
*B32B 3/10* (2006.01)
(52) U.S. Cl. ........................................ 428/126; 428/137
(58) Field of Classification Search .................. 428/126, 428/137, 354  
See application file for complete search history.

(56) References Cited

U.S. PATENT DOCUMENTS

| | | | |
|---|---|---|---|
| 5,816,526 A | 10/1998 | Bartelmuss et al. | |
| 2004/0131825 A1 | 7/2004 | Dever et al. | |
| 2005/0008817 A1* | 1/2005 | Rodriguez et al. | 428/98 |
| 2005/0186417 A1 | 8/2005 | Rodriguez | |

FOREIGN PATENT DOCUMENTS

| | | | |
|---|---|---|---|
| DE | 195 37 829 A1 | 10/1996 | |
| DE | 197 21 683 A1 | 11/1998 | |
| DE | 101 20 148 A1 | 2/2003 | |
| DE | 10 2005 056 406 A1 | 5/2007 | |
| GB | 324326 | 1/1930 | |
| GB | 468485 | 7/1937 | |
| GB | 475774 | 11/1937 | |
| GB | 632709 | 12/1949 | |

* cited by examiner

*Primary Examiner* — Alexander Thomas  
(74) *Attorney, Agent, or Firm* — Breiner & Breiner, LLC

(57) ABSTRACT

A multilayer paper tape including two or more paper sheets which are bonded by adhesive layers is described. Each of the top layer and the bottom layer of this stack of paper sheets and adhesive layers is an adhesive layer, around which, as a casing, is formed a folded paper sheet enclosing the stack of paper sheets and adhesive layers. This folded paper sheet is completely surrounded by an adhesive layer. A process for producing the same is also described.

10 Claims, 2 Drawing Sheets

MULTILAYER PAPER TAPE

FIELD OF THE INVENTION

The present invention relates to a multilayer paper tape which can be used for forming a hooping of transport materials such as packages, pulp bales, pallets and so on.

BACKGROUND OF THE INVENTION

DE 197 21 683 A1 describes a packaging container to be used for forming a freight package made of a paperboard-cardboard material, the packaging container being provided with a bonded, abrasion- and tear-resistant hooping for sealing and confining the packaging container, the hooping being formed as a multilayered folded flat tape.

However, the hooping disclosed in DE 197 21 683 A1 proved not to have sufficient strength with concomitant good elasticity. Additionally, the hooping disclosed in DE 197 21 683 A1 does not have an antislip property.

SUMMARY OF THE INVENTION

An object of the present invention is thus to provide a biologically degradable hooping which has sufficient strength with concomitant acceptable elasticity and simultaneously provides sufficient antislip property for, on the one hand, preventing slipping of the hooping and, on the other hand, preventing slipping of the upper sheets in a stacked material.

The subject matter of the present invention is a multilayer paper tape.

The subject matter of a further aspect of the present invention is a process for producing a multilayer paper tape.

The subject matter of the present invention is explained below in more detail by an embodiment illustrated with the aid of drawings.

DESCRIPTION OF THE PREFERRED EMBODIMENTS

Figure 1:
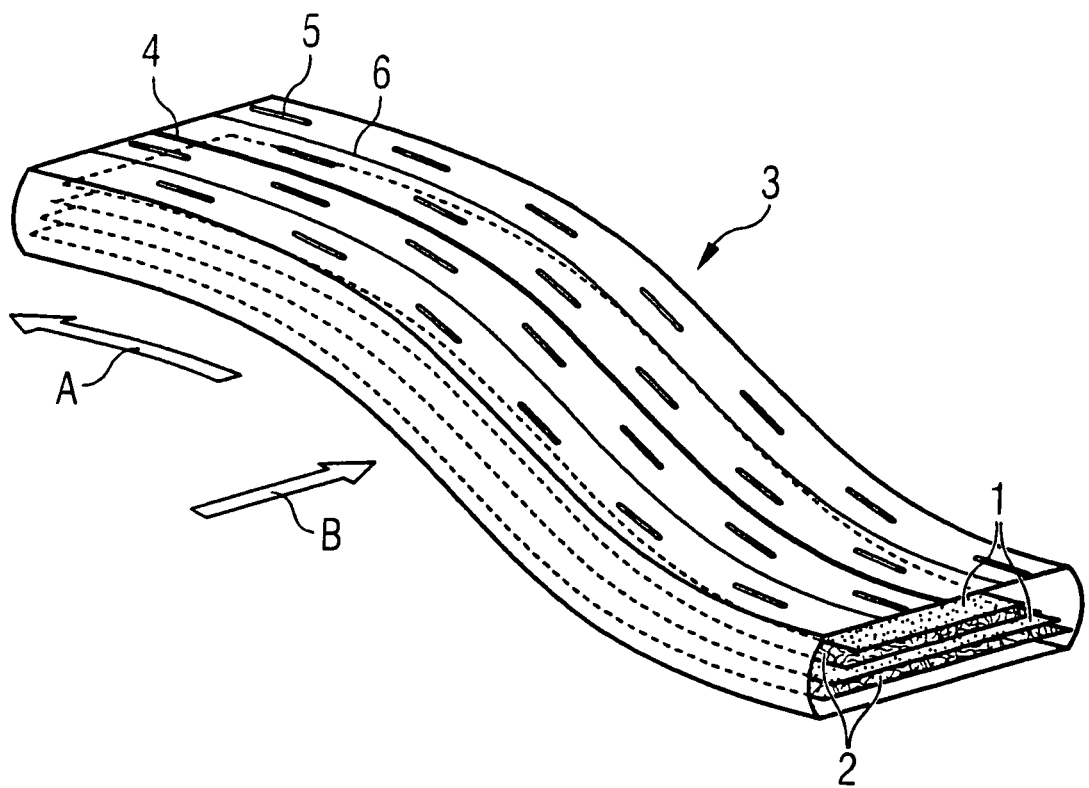
FIG. 1 shows a schematic view of a section of the multilayer paper tape of the invention.
Figure 2:
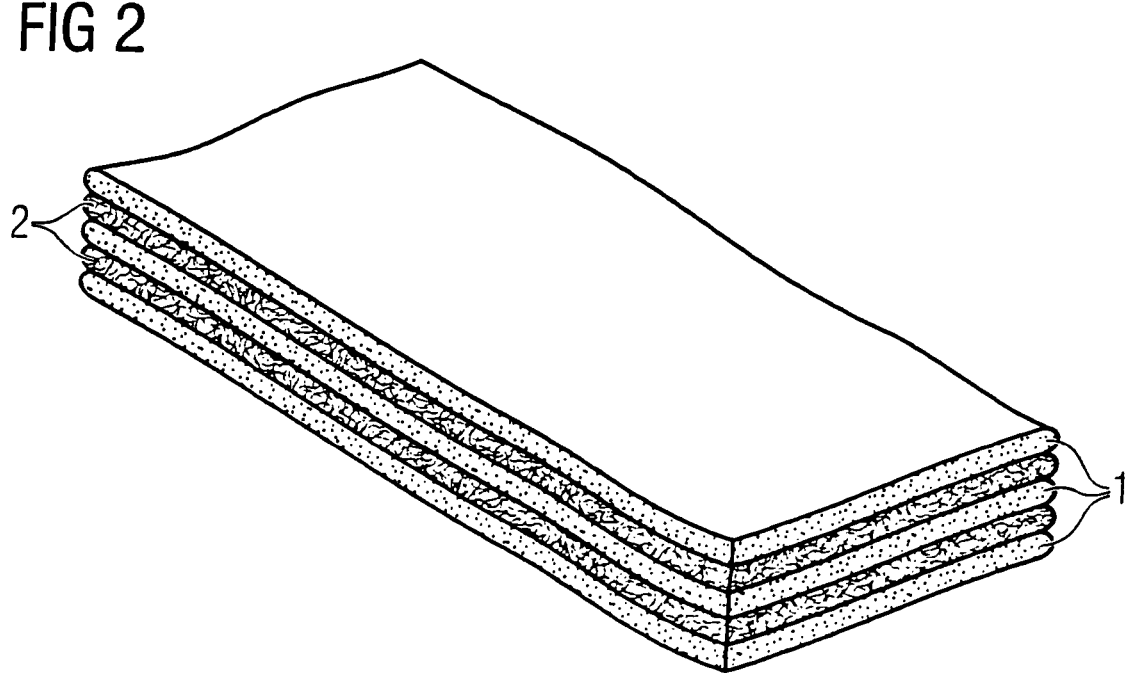
FIG. 2 shows an isolated view of a stack of paper sheets and adhesive layers enclosed in a folded paper sheet.

The multilayer paper tape of the invention preferably comprises two or more, more preferably from 3 to 10, most preferably from 4 to 6 paper sheets (2) which are bonded by adhesive layers (1) each provided between two paper sheets. Each of the top and the bottom layer of this stack of paper sheets and adhesive layers is made of an adhesive layer. Around these adhesive layers a folded paper sheet (3) is formed, as a casing, enclosing the stack of paper sheets and adhesive layers. The sheet edge (4) of the paper sheet which functions as a casing is hereby usually arranged so that it runs in the longitudinal direction of the paper sheet (direction A in FIG. 1) on the upper or lower side (which is the broad side) of the paper tape, preferably in the center on the upper or lower side of the paper tape (see for example FIG. 1. Additionally, the formation of a paper sheet casing into which a plurality of paper sheets is inserted, may have one or more groups, preferably two or more groups of compactions (6) and/or perforations (5). These can be formed on the upper and/or lower side of the paper tape. The compactions (6) are usually incorporated into the paper tape of the invention to improve the rigidity of the paper tape of the invention. Surprisingly, it has been found that by incorporating perforations, the elasticity characteristics of the paper tape of the invention can be enhanced. The compactions (6) and/or perforations (5) can run parallel to the sheet edge of the paper tape of the invention or in a certain angle to it for the entire length of the paper tape or for only some sections of the paper tape. Preferably, the compactions (6) and/or perforations (5) are provided along the entire length of the paper tape. In a preferred embodiment of the present invention the paper tape of the invention has two groups of perforations running parallel to one another in the longitudinal direction, wherein the two groups of perforations are displaced to one another in the transverse direction. If perforations running in the longitudinal direction (direction A) are incorporated into the paper tape of the invention, the elasticity of the paper tape of the invention can be increased. Thus, for example, by incorporating two groups of perforations of from 0.2 to 2 cm in length, which are spaced apart from one another by from 0.5 to 3 cm, preferably 0.8 to 2 cm in the longitudinal direction and from 1 to 8 mm, preferably 3 to 6 mm in the transverse direction, wherein the two groups of perforations are displaced to one another in the transverse direction, an elasticity is achieved which is improved by 100% (i.e., an increase of the elasticity of the paper tape of the invention from 4% to 8%). The compactions (6) are usually incorporated into the paper tape with an embossing device such as a marking wheel and/or an embossing wheel. The perforations (5) are usually incorporated into the paper tape by means of a perforating device such as a perforation wheel. The depth of the compactions (6) is usually from 0.01 to 1.4 mm, preferably from 0.1 to 0.4 mm. The distances of the compactions (6) in the transverse direction are usually from 0.1 to 5 mm, preferably from 2 to 4 mm. The distances of the perforations (5) in the longitudinal direction (direction A in FIG. 1) are usually from 0.5 to 3 cm, preferably from 0.8 to 2 cm, and in the transverse direction (direction B in FIG. 1) usually from 1 to 8 mm, preferably from 3 to 6 mm. The perforations may be point perforations or perforations extending in one direction, for example in longitudinal direction, having, for example, a length of from 0.2 to 2 cm, preferably a length of from 0.5 to 1.5 cm. The formation of the folded paper sheet optionally having compactions and/or perforations into which is inserted a plurality of paper sheets, is integrally surrounded by an adhesive layer to form a closed outer skin.

The adhesives used are, for example, a glue or a vinyl acetate adhesive, particulary a vinyl acetate adhesive.

The paper sheets have preferably a width between 1 and 100 mm, more preferably 5 to 50 mm, most preferably 10 to 30 mm.

The thickness of the paper sheets is preferably 20 to 800 μm, more preferably 100 to 500 μm, most preferably 200 to 300 μm.

The thickness of the adhesive layers is preferably 5 to 100 μm, more preferably 10 to 60 μm, most preferably 30 to 50 μm.

The overall thickness of the multilayer paper tape of the invention is preferably 0.01 to 5 mm, more preferably 0.1 to 2 mm, most preferably 1.0 to 1.5 mm.

The paper sheet used according to the invention is preferably made from wood pulp, semi-chemical pulp or chemical pulp, more preferably long-fiber pulp.

Figure 3:
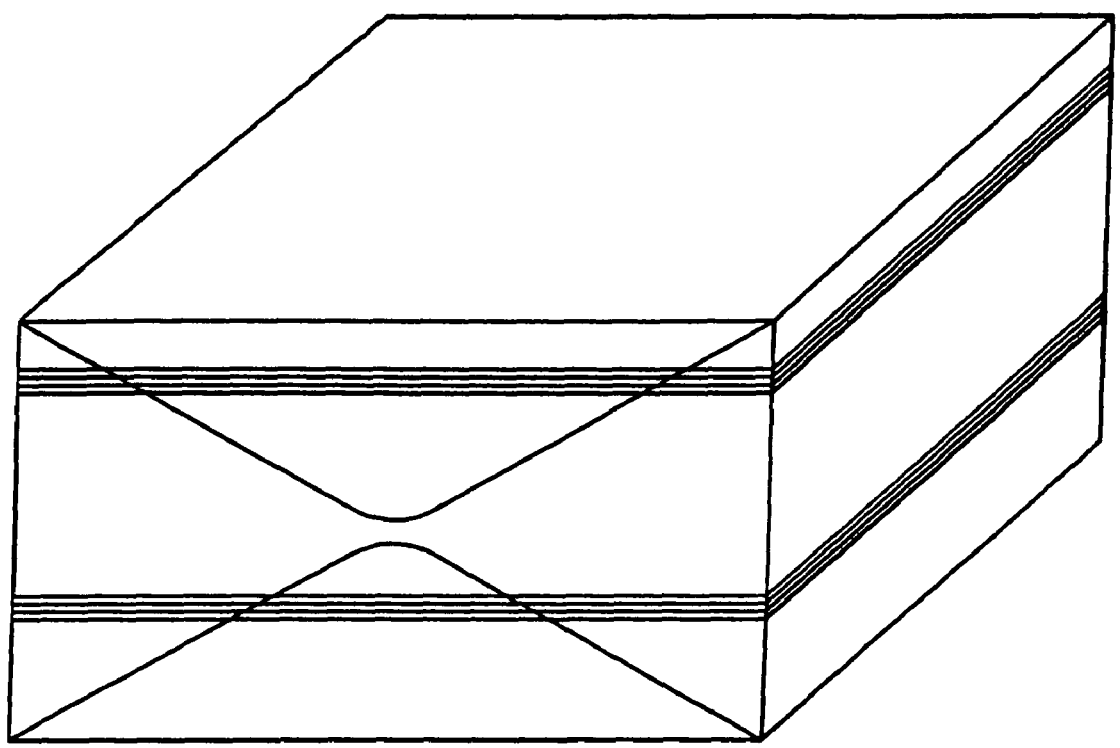
FIG. 3 shows a pulp bale which is horizontally hooped by the multilayer paper tape of the invention.

By the presence of an adhesive layer as an outer skin of the paper tape of the invention, the paper tape of the invention is provided with an antislip property so that the paper tape of the invention can also be used for horizontally bundling articles (see for example FIG. 3). Additionally, the antislip property of the paper tape of the invention also positively affects transportation because, by using the paper tape of the invention, damage by transport machines can be prevented, such as by roller conveyor tracks or by forks of a high-lift truck.

The subject matter of a further aspect of the present invention is a process for producing a paper tape of the invention, comprising the following steps:

bonding individual paper sheets by means of an adhesive into a multilayer stack of paper sheets, each of the top and the bottom layer being an adhesive layer;

folding a paper sheet around the stack of paper sheets; and forming an adhesive layer in the form of a closed outer skin on the stack of paper sheets having folded around a paper sheet.

In a preferred embodiment the process for producing a paper tape of the invention comprises the additional step of compacting and/or perforating the paper tape obtained in step 2 above.

As explained above, the paper sheet used according to the invention is usually made from wood pulp, semi-chemical pulp or chemical pulp. From these materials, webs of a suitable width, for example a width of from 5 to 50 mm, are cut. Then the "bobbins", as they are called, are usually provided with an adhesive, superimposed on one another and compressed. As explained above, usually two or more paper sheets are arranged one on top of the other. The superimposing of the paper sheets can, for example, be made by using a commercially available tape production apparatus. The resulting formation has an adhesive layer as each of the top and the bottom layers. Subsequently, a paper sheet of an appropriate size is folded around this stack of paper sheets followed by compression. Then the resulting formation can be compacted and perforated, for example by means of an embossing or marking wheel and/or by means of a perforation wheel. Subsequently, the resulting formation is coated by an outer skin formed of adhesive. The coating can be performed by an immersion treatment, for example. Subsequently the outer adhesive layer is dried and cured, for example, by using radiant heaters. By subsequently cooling the surface layer, the outer skin can be prevented from cohering when winding up the multilayer paper tape.

Hereinafter, the present invention is described by way of an example. This example serves merely as an illustration in no way limits the multilayer paper tape as defined in the claims.

For producing the multilayer paper tape described in the present example, commercially available long-fiber pulp (brown paper of a basis weight of 160 g/m$^2$) was used as a starting material. Then, from webs of this long-fiber pulp strips having a width of 19 mm and 39 cm, respectively, were cut in a roll cutter. These "bobbins" as they are called, were hung into the unroll gate of a commercially available draught frame and introduced one after the other into the draught frame. In the example described, 4 tapes of 19 mm in width and one tape of 39 mm in width were used as a fold. All these paper tapes were guided over a plurality of deflection units through glue coating stations filled with a commercially available glue (Türmer DL 100), followed by positioning one above the other, compressed together and laying the protective outer sheet around the stack of paper by means of a folder. Then two longitudinal compactions and two groups of longitudinal perforations were provided onto the tape by means of a marking wheel and a perforation wheel, respectively, so that the two groups of perforations run parallel to one another in the longitudinal direction and run displaced to one another in the transverse direction (length of perforations: 1 cm, distance in the longitudinal direction: 1 cm, distance in the transverse direction: 5 mm, depth of compactions on the top and bottom side: 0.2 mm). Subsequently, the paper tape was once again drawn through a glue coating station to produce an antislip outer layer. In order to strengthen and keep the form of the complete paper tape formation, the resulting multilayer paper tape was then fixed and dried by means of radiant heaters (medium frequency infrared carbon radiators). The following cooling in a dancer-controlled cooling gate prevented the antislip outer skin from cohering when winding it up onto a predefined cardboard core.

It is claimed:

1. Multilayer paper tape comprising at least two paper sheets which are bonded together by adhesive layers to provide a multilayer stack, wherein each of a top layer and a bottom layer of the stack of said paper sheets and said adhesive layers is one of said adhesive layers, around which, a folded paper sheet is provided as a casing enclosing the stack of said paper sheets and said adhesive layers, said folded paper sheet being completely surrounded by an adhesive layer, wherein the multilayer paper tape further comprises (1) two groups of perforations running parallel to one another in a longitudinal direction, said two groups of perforations also being displaced in relation to one another in a transverse direction, and (2) compactions on an upper side, a lower side, or upper and lower sides of the multilayer paper tape.

2. The multilayer paper tape according to claim 1, wherein said tape has a total thickness of from 1.0 to 1.5 mm.

3. The multilayer paper tape according to claim 2, comprising from 4 to 6 paper sheets.

4. The multilayer paper tape according to claim 2, wherein layer thickness of the paper sheets is in a range of from 200 to 300 μm.

5. The multilayer paper tape according to claim 1, comprising from 4 to 6 paper sheets.

6. The multilayer paper tape according to claim 5, wherein layer thickness of the paper sheets is in a range of from 200 to 300 μm.

7. The multilayer paper tape according to claim 1, wherein layer thickness of the paper sheets is in a range of from 200 to 300 μm.

8. Process for producing a multilayer paper tape according to claim 1 comprising:

bonding individual sheets of said at least two paper sheets by an adhesive to provide said multilayer stack of said paper sheets and said adhesive layers, wherein each of the top layer and the bottom layer of the stack is an adhesive layer;

folding a paper sheet around the stack of said paper sheets;

perforating and compacting the stack of said paper sheets; and forming an adhesive layer so as to provide a closed outer skin of adhesive on the stack of said paper sheets which is folded around said stack.

9. The multilayer paper tape according to claim 1, wherein the compactions have a depth of from 0.01 to 1.4 mm, with distances between the compactions in the transverse direction being 0.1 to 5 mm.

10. The multilayer paper tape according to claim 1, wherein said two groups of perforations have a length of from 0.2 to 2 cm and are spaced apart from one another by from 0.5 to 3 cm in the longitudinal direction and from 1 to 8 mm in the transverse direction.

* * * * *